Patented Dec. 25, 1923.

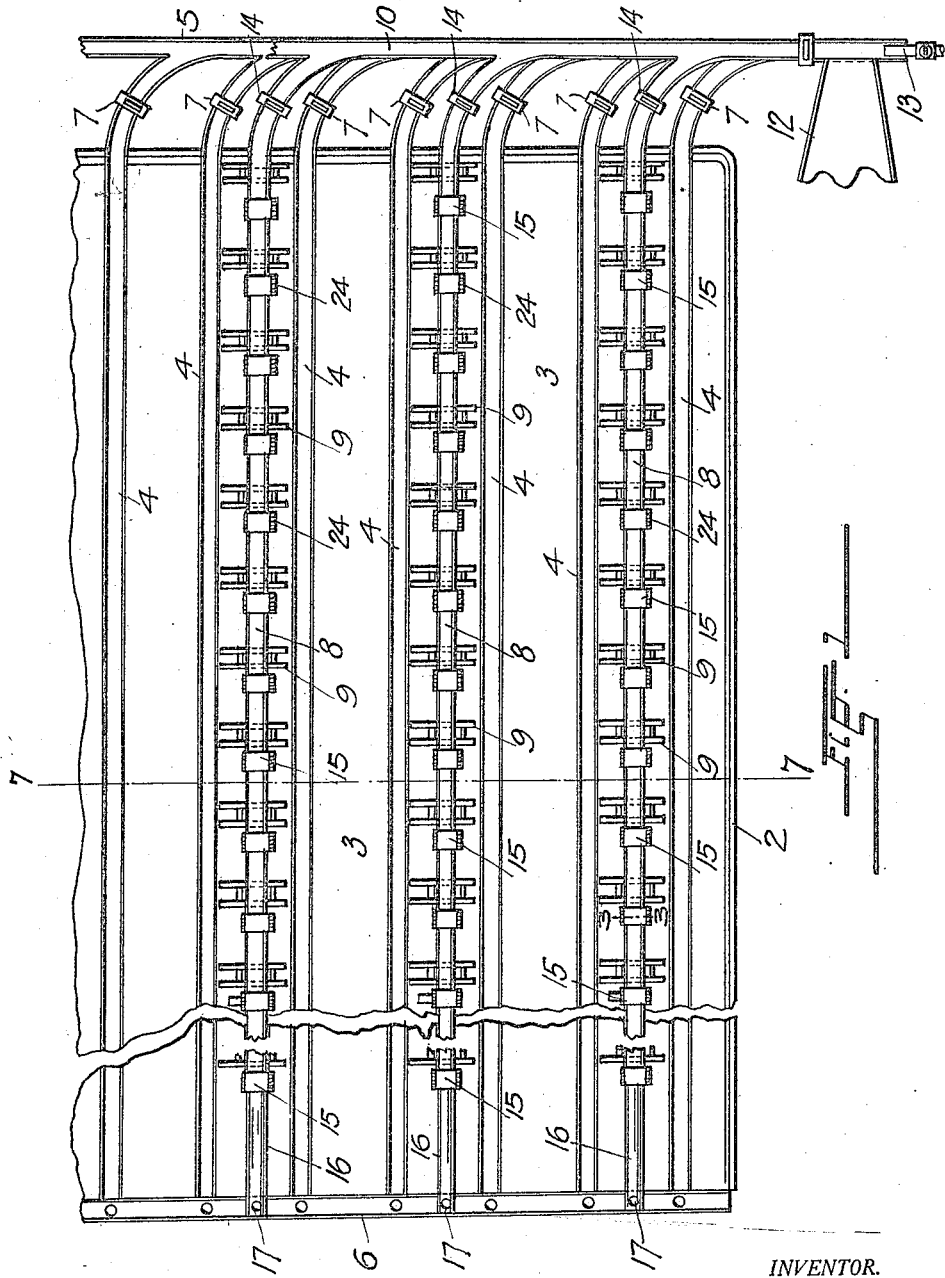

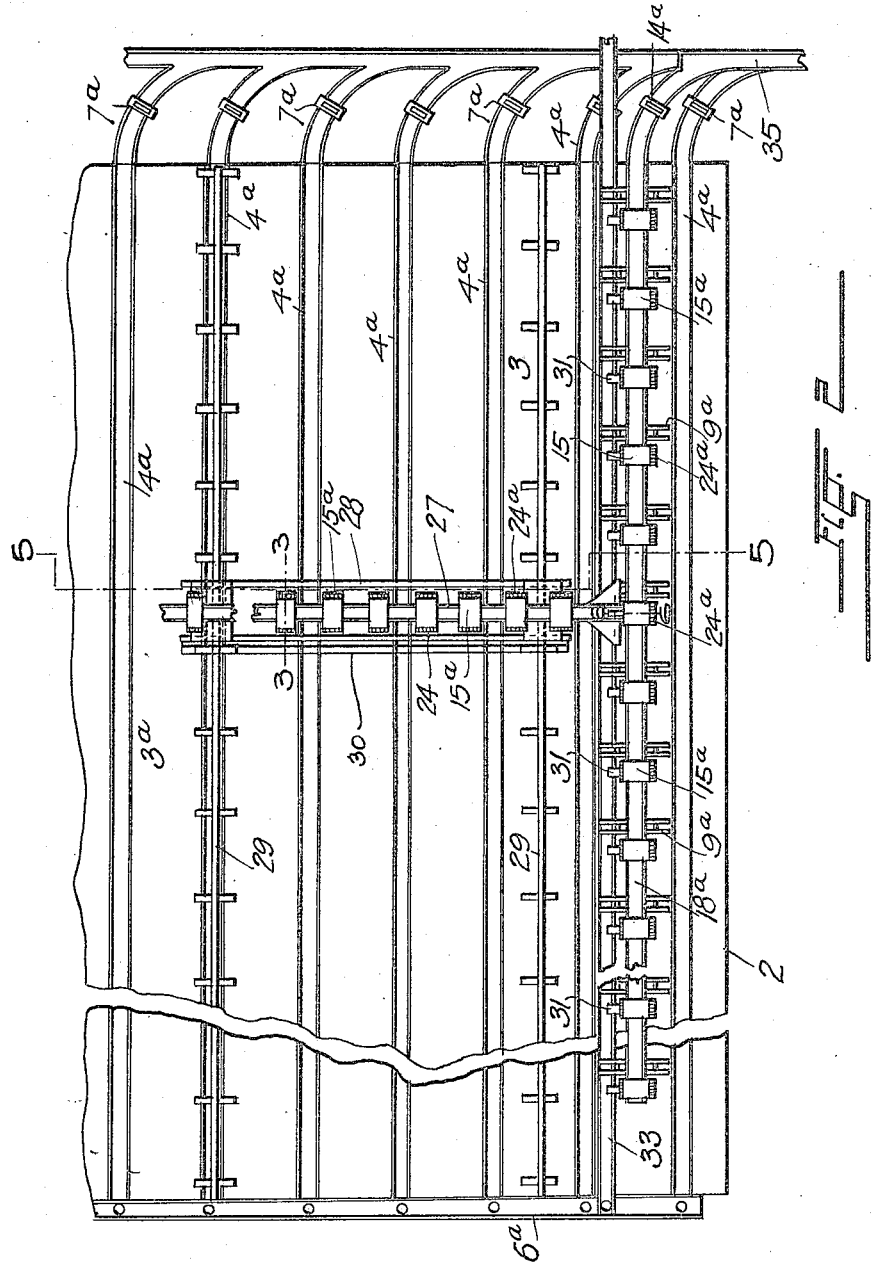

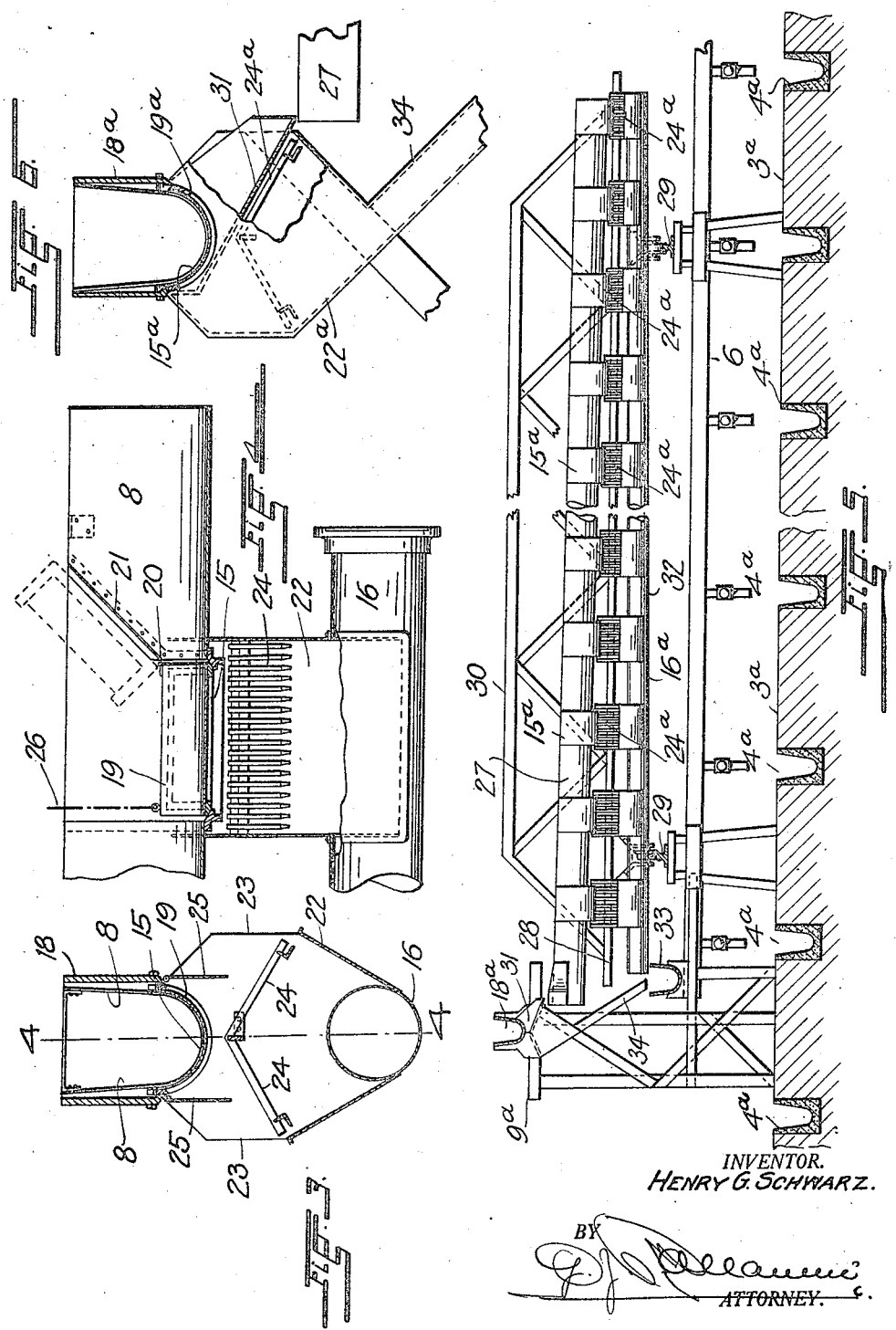

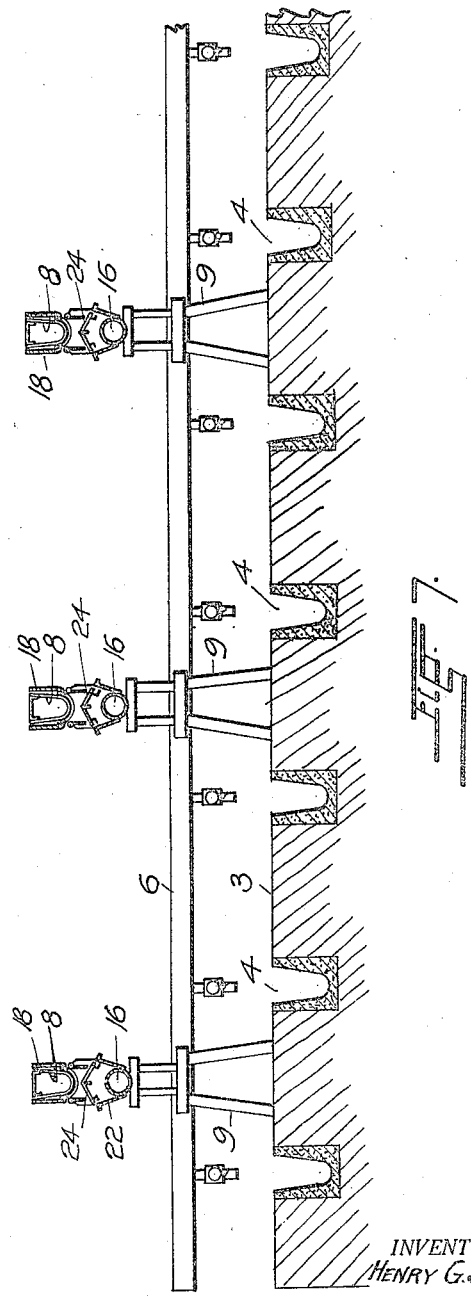

1,478,534

UNITED STATES PATENT OFFICE.

HENRY G. SCHWARZ, OF DENVER, COLORADO.

SUGAR-BEET STORAGE.

Application filed June 18, 1919. Serial No. 305,135.

*To all whom it may concern:*

Be it known that I, HENRY G. SCHWARZ, a citizen of the United States, residing at Denver, in the county of Denver and State of Colorado, have invented certain new and useful Improvements in Sugar-Beet Storage, of which the following is a specification.

This invention relates to the storage of sugar beets and its primary object is to provide a novel, economical and labor-saving method of conveying sugar-beets to sheds in which they are stored for use in the factories.

With this object in view, my invention consists in providing a system of flumes above the surface of the storage shed, which as usual has a series of sunken troughs through which the beets are floated to the factory by the waste water of the sugar process.

The beets brought in from the field are delivered into a receiving bin from where they are conveyed by a belt-conveyer, pneumatic beet-lift or other suitable device to the flumes above the storage surface.

The beets are floated through the flumes by a supply of water and are dumped onto the storage surface at different points through gate-controlled outlets in the bottoms of the flumes.

The water used for floating the beets to the storage place is separated from the beets at the time they are discharged from the flumes and may be made to flow to the sunken troughs in the storage surface for use in subsequently floating the beets to the factory.

Waste water from the factory may thus be used through the entire process of conveying the beets to and from the storage sheds, which at places where a supply of fresh water is not readily available, is of considerable economic value.

The flumes above the storage surface, through which the beets are delivered, may be arranged in series at regular intervals and in connection with a header into which the beets and water are fed as hereinbefore explained, or a single flume may be placed above one end of the surface and a traveling flume employed to transport the beets and water from the stationary flume to different points of discharge.

When there are a number of stationary flumes above the storage surface, they are separately controlled by gates so that the liquid and floating matter may be directed into any one of the flumes separate from the others and when a traveling flume is employed in cooperation with a single stationary flume, both flumes are provided with the gate-controlled outlets and water separating appliances hereinbefore referred to.

It will be seen from this brief description of my invention that the installation and cost of operation and maintenance of the system of delivering beets to the storage sheds by flotation is considerably less than the expenses connected with installing, operating and maintaining the overhead tracks and wagon trucks at present commonly used for the same purpose.

My improved system has the further advantages of preventing injury to the beets in transportation and of cleaning the same from adherent dirt before they are dumped onto the storage surface, the last-mentioned feature being of particular value since it promotes the circulation of air required to keep the beets from decomposition if stored for any length of time.

An embodiment of my invention in its preferred form has been shown in the accompanying drawings in the various views of which corresponding parts are designated by similar characters of reference and in which Figure 1 is a plan view of the system as composed of a series of stationary flumes;

Figure 2, a similar view of the system employing a traveling flume;

Figure 3, an enlarged transverse section taken through one of the discharge gates of any one of the flumes as for example along the line 3—3, in Figures 1 and 2;

Figure 4, a fragmentary section taken on the line 4—4, Figure 3;

Figure 5, an enlarged section taken on the line 5—5, Figure 2,

Figure 6, a fragmentary, further enlarged section on the line 6—6, Figure 2, and Figure 7 an enlarged section taken on the line 7—7, Figure 1.

Referring first to Figure 1 of the drawings the reference character 2 designates a storage shed which usually consists of an enclosed surface 3 in which a plurality of parallel troughs 4 are embedded for floating the stored beets to the factory.

The troughs are connected at their discharge ends to a header 5 which conveys the beets to the plant and in the present construction they receive the water for floating the beets, at their opposite ends from a superimposed transversely extending trough 6.

Gates 7 at the discharge ends of the troughs control the passage of the beets into the header.

My improved conveying system comprises a series of parallel flumes 8 mounted upon trestles 9 above the storage surface and connected at one of their ends to a header 10.

The beets are delivered into the header from a conveniently disposed chute 12 or other conveying device connecting with a supply-bin, and the water for floating the beets to and through the several flumes is supplied to the header through a valve-controlled pipe 13.

Gate valves 14 adjacent the entrances of the flumes control the passage of the floating beets from the header into the same.

Each flume has a plurality of equidistantly disposed gate-controlled outlets 15 for the discharge of the beets onto the storage surface and beneath each outlet is a straining device for separating the liquid from the beets before they reach the surface.

The liquid separated from the beets is conducted into pipes 16 running parallel with the flumes and provided with discharge openings 17 above the before mentioned transverse trough 6 which feeds the liquid into the troughs 4 of the storage surface.

The construction of the outlet gates and strainers of the flumes has been shown in detail in Figures 3 and 4 in which the reference numeral 18 designates the gate-housing which is connected between two separated sections of the flume and forms a continuation thereof.

The housing has in its bottom an outlet 15 surrounded by a seat for a drop gate 19 which is hinged at one of its ends as at 20 and which in its open position rests upon an inclined seat 21 as indicated in broken lines in Figure 4.

Suspended from the flume beneath the outlet is a hopper 22 which opens into the corresponding water pipe 16 and which in its opposite sides has openings 23 through which the beets may pass onto the storage surface.

Alined with the lower ends of these openings are grates 24 which slant from a vertex immediately beneath the outlet of the flume in opposite directions.

Flaps 25 pivotally suspended from the gate-housing at opposite sides of the outlet of the flume guide the matter discharged therethrough onto the grates without the possibility of clogging.

It will be seen that when the gate 15 is opened which is readily accomplished by means of a chain or rope 26 connected at its end opposite to that at which it is hinged, the beets and the liquid in which they are floated, pass through the outlet 15 onto the grates, the liquid flowing between the bars thereof into the hopper 22 and the beets sliding along the same to be dumped onto the storage surface.

By proper adjustment of the gate valves 14 which control the passage of the beets from the header into the flumes, and of the drop gates 19 which normally close the outlets of each flume, the beets may thus be evenly distributed over the storage surface from which they are discharged by water admitted to any one or more of the sunken troughs, from the transverse trough 6 which receives the liquid discharged from the pipes 16 associated with the flumes 8 as hereinbefore described.

In the construction shown in Figures 2, 5 and 6, a single stationary flume 18$^a$ connected with a transverse feed branch 35 is placed at a side of the storage surface in parallel relation to the sunken discharge troughs thereof.

A flume 27 which in construction is identical to the flumes hereinbefore described, is mounted on a wheeled carrier 28 which travels upon the rails 29 of a track supported above the storage surface in parallel relation to the stationary flume, a bridge 30 forming part of the carrier to afford ready access to the outlet gates of the flume.

The stationary flume is provided with spouts 31 in connection with its outlets, to deliver the beets and the water by which they are floated, into the end of the traveling flume which extends at right angles thereto.

The outlet gates of the moving flume are identical to those hereinbefore described and the strainers discharge the water separated from the beets, into the drain-pipe 16$^a$ mounted on the carrier with its discharge end above a water-trough 33 placed adjacent the stationary flume 18$^a$ which as in the first-mentioned construction, delivers the water into the transverse water-trough 6$^a$ which discharges into the sunken troughs 4$^a$ of the storage surface.

By removing the spouts 31 from the gate housings of the stationary flume, the beets may be dumped upon the portion of the storage surface immediately below the flume if so desired, the hoppers 22$^a$ of the flume beneath its strainers being provided with spouts 34 which deliver the water separated from the beets by the strainers, into the before-mentioned trough 33.

In the operation of the last-described form of my invention, the beets are floated in and through the flume 18ª from the transverse branch 35 to which the beets and water are supplied from a conveniently located bin and source of water supply.

The carrier 28 is moved along its track to bring the end of its flume in line with the several outlets of the stationary flume, and by opening the outlet gates of the traveling flume, the beets are dumped at any desired point of the storage surface while the water by which they were floated through the flumes is conducted to the stationary trough 33 by means of the drain pipe 16ª.

The beets are thus evenly distributed over the storage surface free from adherent dirt, as in the operation of the first described form of my invention, and are floated to the factory by the admission of water to the sunken troughs.

Having thus described my invention what I claim and desire to secure by Letters-Patent is:

1. In a beet-storing system, the combination with a storage-surface having means for the discharge of beets by flotation, a flume above the surface, having outlets for beets and water, strainers for separating the water from the beets passing through the outlets, a conduit receiving the water passing through the strainers, and means for conducting the water discharged from the conduit, to the storage-surface for the removal of beets stored thereon, by flotation.

2. In a beet storing system, the combination of an elevated flume having outlets for beets and water, gates normally closing the outlets and separately movable to an open position, an elevated track, a carrier movable thereon, a flume on the carrier adapted to be brought in line with the outlets of the first-mentioned flume, to receive the beets and water passing therethrough, the flume on the carrier having a plurality of outlets, gates normally closing the same, and strainers for separating the water from the beets passing through the outlets, a conduit receiving the water passing through the strainers, and a stationary trough receiving the water discharged from the conduit.

3. In a beet-storing system, the combination of an elevated flume having an outlet for beets and water, an elevated track, a carrier movable thereon, a flume on the carrier adapted to be brought in line with the outlet of the first-mentioned flume, to receive the beets and water passing therethrough, the flume on the carrier having an outlet, a gate normally closing the same, and a strainer for separating the water from the beets passing through the outlet, a conduit receiving the water passing through the strainer, and a stationary trough receiving the water discharged from the conduit.

4. In a beet-storing system, the combination of an elevated flume having an outlet for beets and water, a gate normally closing the outlet, a strainer for separating water from beets passing through the outlet, a removable spout above the strainer to receive beets and water passing through the outlet, a trough disposed to receive water passing through the strainer, an elevated track, a carrier movable thereon, a flume on the carrier, adapted to be brought in line with the spout to receive the beets and water passing through the outlet of the first-mentioned flume, the flume on the carrier having an outlet, a gate normally closing the same, and a strainer for separating the water from the beets passing through the outlet, and a conduit receiving the water passing through the strainer and having an outlet above said trough.

5. In a beet-storing system, an elevated flume having an outlet in its bottom, a gate normally closing the same, a hopper beneath the outlet, a conduit connecting therewith, and a slanting grate in the hopper for separating water from beets passing through the outlet, and delivering the beets outside of the hopper.

6. In a beet-storing system, an elevated flume having an outlet in its bottom, a gate normally closing the same, a hopper beneath the outlet, a conduit connecting therewith, and grates slanting in opposite directions from a vertex in the hopper for separating water from beets passing through the outlet, and delivering the beets outside of the hopper.

7. In a beet-storing system, an elevated flume having an outlet in its bottom, a gate normally closing the same, a hopper beneath the outlet, a conduit connecting therewith, a slanting grate in the hopper for separating water from beets passing through the outlet, and delivering the beets outside of the hopper, and a flap door at a side of the outlet, for guiding the beets onto the grate.

8. The method of storing sugar beets consisting in floating beets in water along a determinate course above a storage surface, and discharging the beets onto the surface at selected points in said course, separate from the conveying liquid.

9. The method of storing sugar beets consisting in floating beets in water along a determinate course above a storage surface, discharging the beets onto the surface at selected points in said course separate from the conveying liquid, and conveying the liquid separate from the beets, onto the surface to remove the beets stored thereon, by flotation.

10. A method of storing sugar beets consisting in conducting the beets along a determinate course above a storage surface by a natural water flow, discharging the beets and water together at selected points in said course, and separating the water from the beets before they reach the surface.

11. A method of storing sugar beets consisting in conducting the beets along a determinate course above a storage surface by a natural water flow, discharging the beets and water together at a given point in said course, separating the water from the beets before they reach the surface, and conveying the water separated from the beets to the storage surface for use in removing beets stored thereon.

In testimony whereof I have affixed my signature.

HENRY G. SCHWARZ.